(12) United States Patent
Son et al.

(10) Patent No.: US 12,435,830 B2
(45) Date of Patent: Oct. 7, 2025

(54) ELECTRIC DEVICE STAND AND DISPLAY DEVICE

(71) Applicant: LG ELECTRONICS INC., Seoul (KR)

(72) Inventors: Changwoo Son, Seoul (KR); Ohkwan Kwon, Seoul (KR); Sangho Yoon, Seoul (KR); Eulpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 219 days.

(21) Appl. No.: 18/112,131

(22) Filed: Feb. 21, 2023

(65) Prior Publication Data

US 2024/0280211 A1    Aug. 22, 2024

(51) Int. Cl.
  *F16M 11/12*    (2006.01)
  *F16M 11/18*    (2006.01)
  *F16M 11/28*    (2006.01)
  *G01S 7/4865*   (2020.01)
  *G01S 17/08*    (2006.01)

(52) U.S. Cl.
  CPC .......... *F16M 11/126* (2013.01); *F16M 11/18* (2013.01); *F16M 11/28* (2013.01); *G01S 7/4865* (2013.01); *G01S 17/08* (2013.01)

(58) Field of Classification Search
  CPC ...... F16M 11/126; F16M 11/18; F16M 11/28; G01S 7/4865; G01S 17/08; G01S 17/10
  USPC .................................................. 248/550, 405
  See application file for complete search history.

(56) References Cited

U.S. PATENT DOCUMENTS

| | | | |
|---|---|---|---|
| 6,484,620 B2* | 11/2002 | Arshad | G01S 17/10 91/1 |
| 10,524,564 B1* | 1/2020 | Wu | A47B 9/20 |
| 11,974,669 B1* | 5/2024 | Klein | A47B 9/20 |
| 2006/0066188 A1* | 3/2006 | Crawford | A47B 51/00 312/247 |
| 2007/0252919 A1* | 11/2007 | McGreevy | F16M 11/28 348/825 |
| 2009/0146039 A1* | 6/2009 | Liu | F16M 13/027 248/542 |
| 2010/0320886 A1* | 12/2010 | Sung | G02F 1/133314 312/245 |
| 2011/0079692 A1* | 4/2011 | Li | F16M 11/105 248/220.21 |

(Continued)

*Primary Examiner* — Christopher Garft
(74) *Attorney, Agent, or Firm* — LEE, HONG, DEGERMAN, KANG & WAIMEY

(57) ABSTRACT

Disclosed is an electronic device stand including a base positioned on a mounting surface, a vertical portion extending in an upward direction from the base and varying in a length, a horizontal portion rotatably connected to an upper end of the vertical portion, and an electronic device coupling portion connected to an end of the horizontal portion, wherein the vertical portion includes a fixed frame connected to the base, a movable frame connected to the horizontal portion, a driver for controlling a distance between the movable frame and the fixed frame, a distance detecting sensor for sensing the distance between the movable frame and the fixed frame, and a reflector positioned at an upper end of the fixed frame and facing the distance detecting sensor. The electronic device stand is able to sense a height of the vertical portion, thereby automatically controlling the vertical portion to have the correct height.

17 Claims, 10 Drawing Sheets

(56) References Cited

U.S. PATENT DOCUMENTS

| | | | | |
|---|---|---|---|---|
| 2018/0140087 A1* | 5/2018 | Wu | ................... | F16H 25/2056 |
| 2019/0261778 A1* | 8/2019 | Lukas | ................... | G01S 7/497 |
| 2021/0294104 A1* | 9/2021 | Hossain | ............ | G02B 27/0093 |
| 2023/0065758 A1* | 3/2023 | Kwon | ................. | F16M 11/125 |
| 2024/0028069 A1* | 1/2024 | Kwon | ............... | F16M 11/2064 |

* cited by examiner (a)

(b)

(a)

(b)

ELECTRIC DEVICE STAND AND DISPLAY DEVICE

BACKGROUND

Field

The present disclosure relates to an electronic device stand having a sensor for measuring a height of the stand to automatically control a height of a vertical portion thereof whose height changes, and a display device including the same.

Discussion of the Related Art

With growth of information society, demand for various display devices has increased. In order to satisfy such demand, in recent years, a liquid crystal display (LCD), a field emission display (FED), a plasma display panel (PDP), and an electroluminescent device have been developed as display devices.

A liquid crystal panel of the liquid crystal display includes a liquid crystal layer and a TFT substrate and a color filter substrate opposite each other in the state in which the liquid crystal layer is interposed therebetween, wherein a picture is displayed using light provided from a backlight unit.

An active matrix type organic light-emitting display has come onto the market as an example of the electroluminescent device. Since the organic light-emitting display is self-emissive, the organic light-emitting display has no backlight, compared to the liquid crystal display, and has merits in terms of response time and viewing angle, and therefore the organic light-emitting display has attracted attention as a next-generation display.

Recently, an element such as the OLED may implement a curved display module because it emits light by itself without a backlight structure on a rear surface thereof, thereby implementing a curved display device.

Recently, a frequency of use of the display device is increasing, and a case of using a plurality of displays in various arrangements is increasing. In some cases, the plurality of displays may be used by being arranged in a vertical direction or the display may be used by being disposed such that a longitudinal direction thereof is the vertical direction.

Accordingly, an electronic device stand for supporting the display device needs to have an adjustable structure to place a display main body at various vertical levels and various angles, and electronic device stands with an automation function so as to be automatically adjusted for precise control are also being released.

SUMMARY

The present disclosure is to provide an electronic device stand having a sensor for measuring a height of the stand in order to automatically control a height of a vertical portion whose height changes, and a display device including the same.

Provided is an electronic device stand including a base positioned on a mounting surface, a vertical portion extending in an upward direction from the base and varying in a length, a horizontal portion rotatably connected to an upper end of the vertical portion, and an electronic device coupling portion connected to an end of the horizontal portion, wherein the vertical portion includes a fixed frame connected to the base, a movable frame connected to the horizontal portion, a driver for controlling a distance between the movable frame and the fixed frame, a distance detecting sensor for sensing the distance between the movable frame and the fixed frame, and a reflector positioned at an upper end of the fixed frame and facing the distance detecting sensor.

The distance detecting sensor may include a time of flight (ToF) sensor including a light emitter for outputting an infrared signal and a light receiver for sensing the reflected and returning infrared signal.

The TOF sensor may have an angle of view equal to or smaller than 22°.

An angle of view of the TOF sensor may be larger at a close range and be smaller at a long range.

The TOF sensor may be able to measure a linear distance equal to or longer than 200 mm.

The reflector may contain a metal material.

The reflector may include a white coated surface.

One side of the reflector may have a length equal to or greater than 25 mm.

The electronic device stand may further include a limit switch positioned side by side with the distance detecting sensor in the movable frame and generating a limit signal to stop the driver when being in contact with the reflector.

The electronic device stand may further include a second casing for covering a section between the movable frame and the fixed frame, and an inner surface of the second casing may have a dark color.

The driver may include a motor fixed to the movable frame, a lead screw extending from the motor, and a moving block having a hole defined therein for the lead screw to be inserted, wherein the moving block is fastened with the fixed frame, and, when the lead screw is rotated by the motor, the moving block may move along the lead screw and the distance between the movable frame and the fixed frame may change.

The driver may further include a damper cylinder, the reflector may be positioned between the lead screw and the damper cylinder, and the reflector may include a groove defined at one side thereof having a shape corresponding to a shape of the damper cylinder.

Screws fastened with the fixed frame may be included in protruding portions on both sides of the groove of the reflector.

One side of the movable frame fastened with the horizontal portion may extend in a horizontal direction.

The base may further include a clamp to be fixed to a table.

According to another aspect of the present disclosure, provided is a display device including a display module for outputting an image, a back cover located on a rear surface of the display module, and a stand coupled to the back cover so as to support the display module, wherein the stand includes a base positioned on a mounting surface, a vertical portion extending in an upward direction from the base and varying in a length, a horizontal portion rotatably connected to an upper end of the horizontal portion, and a coupling portion connected to an end of the horizontal portion and coupled to the back cover, wherein the vertical portion includes a fixed frame connected to the base, a movable frame connected to the horizontal portion, a driver for controlling a distance between the movable frame and the fixed frame, a distance detecting sensor for sensing the distance between the movable frame and the fixed frame, and a reflector positioned at an upper end of the fixed frame and facing the distance detecting sensor.

The electronic device stand of the present disclosure may sense the height of the vertical portion, thereby automatically controlling the vertical portion to have the correct height.

The electronic device stand may sense an absolute location thereof without an increase in the size thereof because of the small volume of the distance detecting sensor.

In addition, an increase in cost may be minimized because the measurement may be performed at a low cost.

Effects that may be obtained in the present disclosure are not limited to the effects mentioned above, and other effects not mentioned will be clearly understood by those of ordinary skill in the art to which the present disclosure belongs from the description below:

DESCRIPTION OF SPECIFIC EMBODIMENTS

Figure 1:
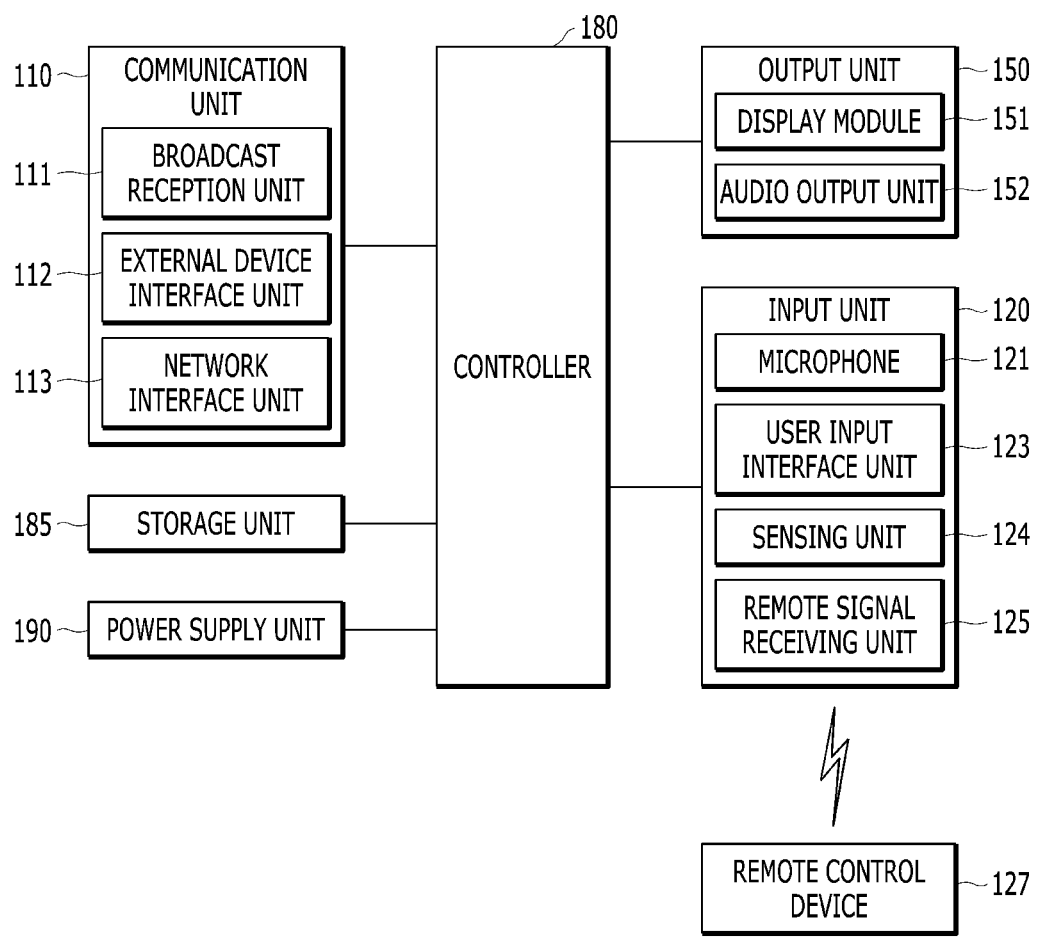
FIG. 1 is a block diagram illustrating components of a display device according to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Meanwhile, a display device 100 described in this specification is, for example, an intelligent display device 100 having a computer supporting function in addition to a broadcast reception function, wherein an Internet function may be added while the broadcast reception function is devotedly performed, whereby an interface that is more conveniently used, such as a handwriting type input device, a touchscreen, or a space remote control, may be provided. In addition, the display device 100 may be connected to the Internet or a computer through support of a wired or wireless Internet function, whereby various functions, such as e-mail, web browsing, banking, or gaming, may be executed. For such various functions, a standardized general-purpose OS may be used.

In the display device 100 described in the present disclosure, therefore, various applications may be freely added or deleted, for example, on a general-purpose OS kernel, whereby various user friendly functions may be executed. More specifically, the display device 100 may be a network TV, an Hbb TV, or a smart TV, and is applicable to a smartphone depending on circumstances.

FIG. 1 is a block diagram illustrating components of a display device 100.

The display device 100 may include a communication unit 110, an input unit 120, a sensing unit 124, an output unit 150, a controller 180, a storage unit 185, and a power supply unit 190. The configuration shown in FIG. 1 may include only some of the components, and one component may perform two functions.

As the communication unit 110, a broadcast reception unit 111 including a tuner unit and a demodulation unit may be included. The tuner unit of the broadcast reception unit 111 may select a broadcast signal corresponding to a channel selected by a user or each of all channels stored in advance among broadcast signals received via an antenna or a cable. The tuner unit may convert the selected broadcast signal into an intermediate frequency signal or baseband video or audio signal.

Meanwhile, the tuner unit may sequentially select broadcast signals of all broadcast channels stored through a channel memory function, among received broadcast signals, and may convert each of the selected broadcast signals into an intermediate frequency signal or a baseband video or audio signal.

The demodulation unit of the broadcast reception unit 111 may receive the digital IF (DIF) signal converted by the tuner unit, and may perform demodulation. After performing demodulation and channel decryption, the demodulation unit may output a stream signal (TS). At this time, the stream signal may be a multiplexed image, audio, or data signal.

The stream signal output from the demodulation unit 112 may be input to the controller 180. After performing demultiplexing and image/audio signal processing, the controller 180 may output an image through the display module 151, and may output audio through an audio output unit 152.

The external device interface unit 112 may connect an external device and the display device 100 to each other to receive an image signal, an audio signal, and a control signal from the external device. The interface unit 112 may be connected to the external device such as a digital versatile disk (DVD), a Blu ray, a game console, a camera, a camcorder, a computer (laptop), and the like in a wired/wireless manner.

The external device interface unit 112 transmits the image, audio, or data signal input from the outside via the connected external device to the controller 180 of the display device 100. In addition, the image, audio, or data signal processed by the controller 180 may be output to the connected external device.

The external device interface unit 112 may include a wired type and a wireless type. The wired type may include a physical terminal equipped in the display device 100, and the wireless type may be connected to the external device via the antenna for receiving a wireless signal.

The wired type may include a USB terminal, a composite video banking sync (CVBS) terminal, a component terminal, a S-video terminal (analog), a digital visual interface (DVI) terminal, a high definition multimedia interface (HDMI) terminal, an RGB terminal, a D-SUB terminal, and the like such that the image and audio signals from the external device may be input to the display device 100.

The wireless type may perform short-range wireless communication with another electronic device located nearby. For example, network connection between the display device 100 and another electronic device may be performed based on communication standards such as Bluetooth, radio frequency identification (RFID), infrared data association (IrDA), Ultra Wideband (UWB), ZigBee, digital living network alliance (DLNA), and the like.

A network interface unit 113 may access a predetermined web page via the connected network or another network linked to the connected network. That is, the network interface unit 113 may access the predetermined web page via the network so as to transmit or receive data with a corresponding server. In addition, content or data provided by a content provider or a network operator may be received.

That is, the content, such as a movie, an advertisement, a game, a VOD, a broadcast signal, and the like, and related information thereof provided from the content provider or the network provider may be received via the network. In addition, update information and an update file of firmware provided by the network operator may be received. In addition, the data may be transmitted to Internet, the content provider, or the network operator.

In addition, the network interface unit 113 may select and receive a desired application among applications open to the public via the network.

According to an embodiment, when executing a game application on the display device, the network interface unit 113 may transmit or receive predetermined data to or from a user terminal connected to the display device in the network. In addition, the network interface unit 113 may transmit or receive the predetermined data to or from a server that stores game scores.

The input unit 120 may include a microphone 121 that collects sound, a user input interface unit 123 that senses a user's command, a sensing unit for sensing a state and a surrounding state of the display device, and a remote signal receiving unit 125 for receiving a signal from a remote control device 127.

The microphone 121 may recognize a user's voice or a surrounding sound, and in particular, may receive the user's voice and process the voice to be electrical voice data. Various noise removal algorithms for removing noise generated in a process of receiving an external sound signal may be implemented in the microphone 121.

The microphone 121 may not simply collect the user's voice, convert the voice into the voice data, and store the voice data in the storage unit 185 or transmit the voice data to the external device via the communication unit 110, but may analyze the voice data and recognize the voice data as the user command, thereby functioning as the user input interface unit 123.

The microphone 121 may be mounted on the remote control device 127 to be described later other than a main body of the display device 100 and transmitted to the controller 180 via the remote signal receiver 125.

The user input interface unit 123 is a device that receives a control command of the user for controlling the display device. The user input interface unit 123 may be constructed as a keypad, a button, a touch pad, a touch screen, or the like.

When the user input interface unit 123 has the hard key button, the user may input a command related to the display device 100 by pushing the hard key button. When the user input interface unit 123 has the touch screen, the user may input the command related to the display device 100 to the remote control device 127 by touching a soft key on the touch screen.

In addition, the user input interface unit 123 may have various types of input means that the user may manipulate, such as a scroll key or a jog key. The present embodiment does not limit the scope of the present disclosure.

Recently, as a size of the bezel of the display device 100 decreases, the display device 100 in a form in which the user input interface unit 123 in the form of the physical button exposed to the outside is minimized is increasing. Instead, the minimum physical button may be located on a rear surface or a side surface of the display device 100, and the user input may be received via the touchpad or via the remote signal receiving unit 125 to be described later from the remote control device 127.

The remote signal receiving unit 125 may receive the command related to the display device 100 via the remote control device 127 having the user input interface unit 123. The remote signal receiving unit 125 may be a kind of user input interface unit 123, and may belong to a wireless communication unit because the remote signal receiving unit 125 receives a signal of the remote control device 127 based on various communication schemes such as a radio frequency (RF) communication scheme, an infrared (IR) communication scheme, and the like.

The sensing unit 124 is a device configured to sense change inside or outside the display device 100. For example, the sensing unit 120 may include at least one of a proximity sensor, an illumination sensor, a touch sensor, an infrared (IR) sensor, an ultrasonic sensor, an optical sensor (e.g. a camera), an audio sensor (e.g. a microphone), a battery gauge, and an environmental sensor (e.g. a hygrometer or a thermometer).

Recently, the display device 100 capable of moving or changing a direction of the display has appeared. Such display device 100 may include a gyro sensor, an acceleration sensor, and the like to sense a posture of the display device.

The controller 180 may check the state of the display device 100 based on information collected by the sensing unit 124, and when a problem occurs, may inform a user of the same or may solve the problem, whereby the controller may perform control such that the display device is maintained in the best state.

In addition, the controller may differently control the content, quality, and size of an image provided to the display module 151 based on a viewer or ambient light sensed by the sensing unit in order to provide the optimum viewing environment. With progress of a smart TV, a large number of functions have been loaded in the display device, and the sensing unit 124 has also been increased in number.

The output unit 150, as a device that provides visual and auditory information to the user via the display device, may include the display module 151 and the audio output unit 152.

The display module 151 may convert an image signal, a data signal, an OSD signal, and a control signal processed by the controller 180 or an image signal, a data signal, and a control signal received from the interface unit to generate a driving signal. The display module 151 may include a display panel having a plurality of pixels.

Each of the plurality of pixels in the display panel may include RGB subpixels. Alternatively, each of the plurality of pixels in the display panel may include RGBW subpixels. The display module 150 may convert an image signal, a data signal, an OSD signal, and a control signal processed by the controller 180 to generate a driving signal for the plurality of pixels.

A plasma display panel (PDP), a liquid crystal display (LCD), an organic light-emitting diode (OLED), or a flexible display may be used as the display module 151, and a 3D display may also be used. The 3D display 151 may be classified as a non-glasses type display or a glasses type display.

The display device 100 includes a display module 151, which occupies a major portion of the front surface thereof, and a case configured to cover the rear surface and the side surface of the display module 151, the case being configured to package the display module 151.

In recent years, the display device 100 has used a flexible display module 151, such as light-emitting diodes (LED) or organic light-emitting diodes (OLED), in order to implement a curved screen.

Light is supplied to an LCD, which was mainly used conventionally, through a backlight unit, since the LCD is not self-emissive. The backlight unit is a device that supplies light emitted from a light source to a liquid crystal uniformly located in front thereof. As the backlight unit has been gradually thinned, a thin LCD has been implemented. However, it is difficult to implement the backlight unit using a flexible material. If the backlight unit is curved, it is difficult to supply uniform light to the liquid crystal, whereby the brightness of a screen is changed.

In contrast, the LED or the OLED may be implemented so as to be curved, since an element constituting each pixel is self-emissive, and therefore no backlight unit is used. In addition, since each element is self-emissive, the brightness of the element is not affected even though the positional relationship between adjacent elements is changed, and therefore it is possible to implement a curved display module 151 using the LED or the OLED.

An organic light-emitting diode (OLED) panel appeared in earnest in mid 2010 and has rapidly replaced the LCD in the small- or medium-sized display market. The OLED is a display manufactured using a self-emissive phenomenon of an organic compound in which the organic compound emits light when current flows in the organic compound. The response time of the OLED is shorter than the response time of the LCD, and therefore afterimages hardly appear when video is implemented.

The OLED is an emissive display product that uses three fluorescent organic compounds having a self-emissive function, such as red, green, and blue fluorescent organic compounds and that uses a phenomenon in which electrons injected at a negative electrode and a positive electrode and particles having positive charges are combined in the organic compounds to emit light, and therefore a backlight unit, which deteriorates color, is not needed.

A light-emitting diode (LED) panel is based on technology of using one LED element as one pixel. Since it is possible to reduce the size of the LED element, compared to a conventional device, it is possible to implement a curved display module 150. The conventional device, which is called an LED TV, uses the LED as a light source of a backlight unit that supplies light to the LCD, and therefore the LED does not constitute a screen.

The display module may include a plurality of pixels R, G, and B. The plurality of pixels R, G, and B may be formed at intersections between a plurality of data lines and a plurality of gate lines. The plurality of pixels R, G, and B may be disposed or arranged in a matrix form.

For example, the plurality of pixels R, G, and B may include a red subpixel 'R', a green subpixel 'G', and a blue subpixel 'B'. The plurality of pixels R, G, and B may include a white subpixel 'W'.

The side of the display module 151 on which a picture is displayed may be referred to as a front side or a front surface. When the display module 151 displays the picture, the side of the display module 151 from which the picture cannot be viewed may be referred to as a rear side or a rear surface. Meanwhile, the display module 151 may be constituted by a touchscreen, whereby an input device may also be used in addition to an output device.

The audio output unit 152 receives an audio signal processed by the controller 180 and outputs the same as audio.

The controller 180 may include at least one processor, and may control the overall operation of the display device 100 using the processor included therein. Here, the processor may be a general processor, such as a central processing unit (CPU). Of course, the processor may be a dedicated device, such as an ASIC, or another hardware-based processor.

The controller 180 may demultiplex a stream input through the tuner unit, the demodulation unit, the external device interface unit 112, or the network interface unit 113, or may process demultiplexed signals to generate and output a signal for image or audio output.

An image signal processed by the controller 180 may be input to the display module 151, which may display an image corresponding to the image signal. In addition, the image signal processed by the controller 180 may be input to an external output device through the external device interface unit 112.

An audio signal processed by the controller 180 may be output through the audio output unit 152. In addition, the audio signal processed by the controller 180 may be input to an external output device through the external device interface unit 111. Although not shown in FIG. 2, the controller 180 may include a demultiplexing unit and an image processing unit, which will be described below with reference to FIG. 3.

Further, the controller 180 may control the overall operation of the display device 100. For example, the controller

180 may control the tuner unit such that a broadcast corresponding to a channel selected by a user or a pre-stored channel is tuned.

In addition, the controller 180 may control the display device 100 according to a user command input through the user input interface unit 123 or an internal program. Meanwhile, the controller 180 may control the display module 151 to display an image. At this time, the image displayed on the display module 151 may be a still image or video, or may be a 2D image or a 3D image.

Meanwhile, the controller 180 may perform control such that a predetermined 2D object is displayed in an image displayed on the display module 150. For example, the object may be at least one of a connected web screen (newspaper or magazine), an electronic program guide (EPG), various menus, a widget, an icon, a still image, video, and text.

Meanwhile, the controller 180 may modulate and/or demodulate a signal using an amplitude shift keying (ASK) method. Here, the amplitude shift keying (ASK) method may be a method of changing the amplitude of a carrier depending on a data value to modulate a signal or restoring an analog signal to a digital data value depending on the amplitude of a carrier.

For example, the controller 180 may modulate an image signal using the amplitude shift keying (ASK) method, and may transmit the modulated image signal through a wireless communication module.

For example, the controller 180 may demodulate and process an image signal received through the wireless communication module using the amplitude shift keying (ASK) method.

As a result, the display device 100 may easily transmit and receive a signal to and from another image display device disposed adjacent thereto without using a unique identifier, such as a media access control (MAC) address, or a complicated communication protocol, such as TCP/IP.

Meanwhile, the display device 100 may further include a photographing unit (not shown). The photographing unit may photograph a user. The photographing unit may be implemented by one camera: however, the present disclosure is not limited thereto. The photographing unit may be implemented by a plurality of cameras. Meanwhile, the photographing unit may be embedded in the display device 100 above the display module 151, or may be separately disposed. Image information photographed by the photographing unit may be input to the controller 180.

The controller 180 may recognize the location of a user based on an image captured by the photographing unit. For example, the controller 180 may recognize the distance between the user and the display device 100 (z-axis coordinate). Further, the controller 180 may recognize an x-axis coordinate and a y-axis coordinate in the display module 151 corresponding to the location of the user.

The controller 180 may sense user gesture based on the image captured by the photographing unit, a signal sensed by the sensor unit, or a combination thereof.

The storage unit 185 may store programs for signal processing and control in the controller 180, and may store a processed image, audio, or data signal. For example, the storage unit 185 may store application programs designed to execute various tasks that can be processed by the controller 180, and may selectively provide some of the stored application programs in response to request of the controller 180.

Programs stored in the storage unit 185 are not particularly restricted as long as the programs can be executed by the controller 180. The storage unit 185 may temporarily store an image, audio, or data signal received from an external device through the external device interface unit 171. The storage unit 185 may store information about a predetermined broadcast channel through a channel memory function, such as a channel map.

FIG. 1 shows an embodiment in which the storage unit 185 and the controller 180 are separately provided: however, the present disclosure is not limited thereto. The storage unit 185 may be included in the controller 180.

The storage unit 140 may include at least one of a volatile memory (e.g. DRAM, SRAM, or SDRAM), a nonvolatile memory (e.g. flash memory), a hard disk drive (HDD), and a solid-state drive (SSD).

The power supply unit 190 may supply power to the components of the display device 100. In particular, the power supply unit may supply power to the controller 180, which may be implemented in the form of a system on chip (SOC), the display module 150 for image display, and the audio output unit 160 for audio output.

Specifically, the power supply unit 190 may include an AC/DC converter (not shown) configured to convert AC power into DC power and a DC/DC converter (not shown) configured to convert the level of the DC power.

Meanwhile, the power supply unit 190 serves to distribute power supplied from the outside to the respective components of the display device. The power supply unit 190 may be directly connected to an external power supply in order to supply AC power, or may include a battery so as to be used by charging.

In the former case, a cable is used, and the power supply unit is difficult to move or the movement range of the power supply unit is limited. In the latter case, the power supply unit is free to move, but the weight of the power supply unit is increased in proportion to the weight of the battery, the volume of the power supply unit is increased, and, for charging, the power supply unit must be directly connected to a power cable or must be coupled to a charging holder (not shown) that supplies power for a predetermined time.

The charging holder may be connected to the display device through a terminal exposed to the outside, or the battery mounted in the power supply unit may be charged in a wireless manner when the power supply unit approaches the charging holder.

In one example, the block diagram of the display device 100 shown in FIG. 1 is only a block diagram for one embodiment of the present disclosure. The components of the block diagram may be integrated, added, or omitted based on specifications of the actually implemented display device 100.

That is, two or more components may be combined into one component, or one component may be subdivided into two or more components as needed. In addition, a function performed in each block is to illustrate the embodiment of the present disclosure, and a specific operation or device thereof does not limit the scope of the present disclosure.

Figure 2:
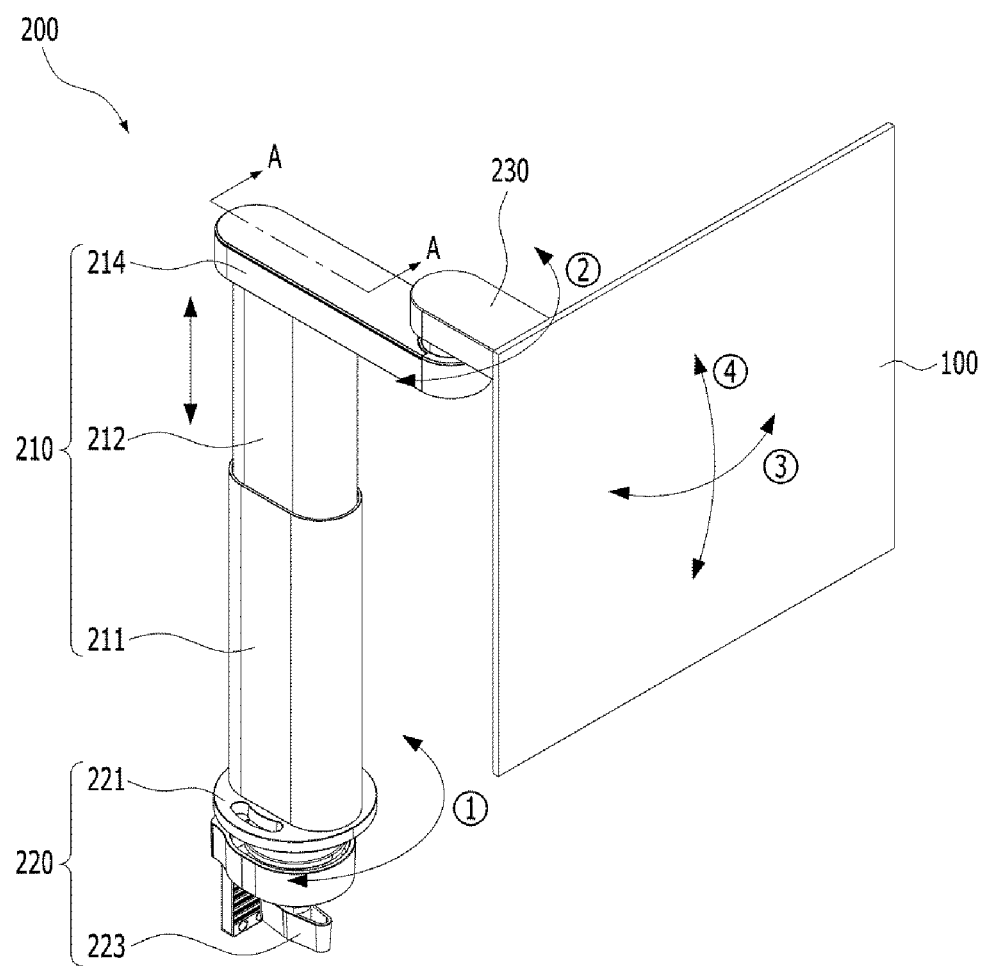
FIGS. 2 and 3 are perspective views illustrating an example of a display device of the present disclosure.
Figure 3:
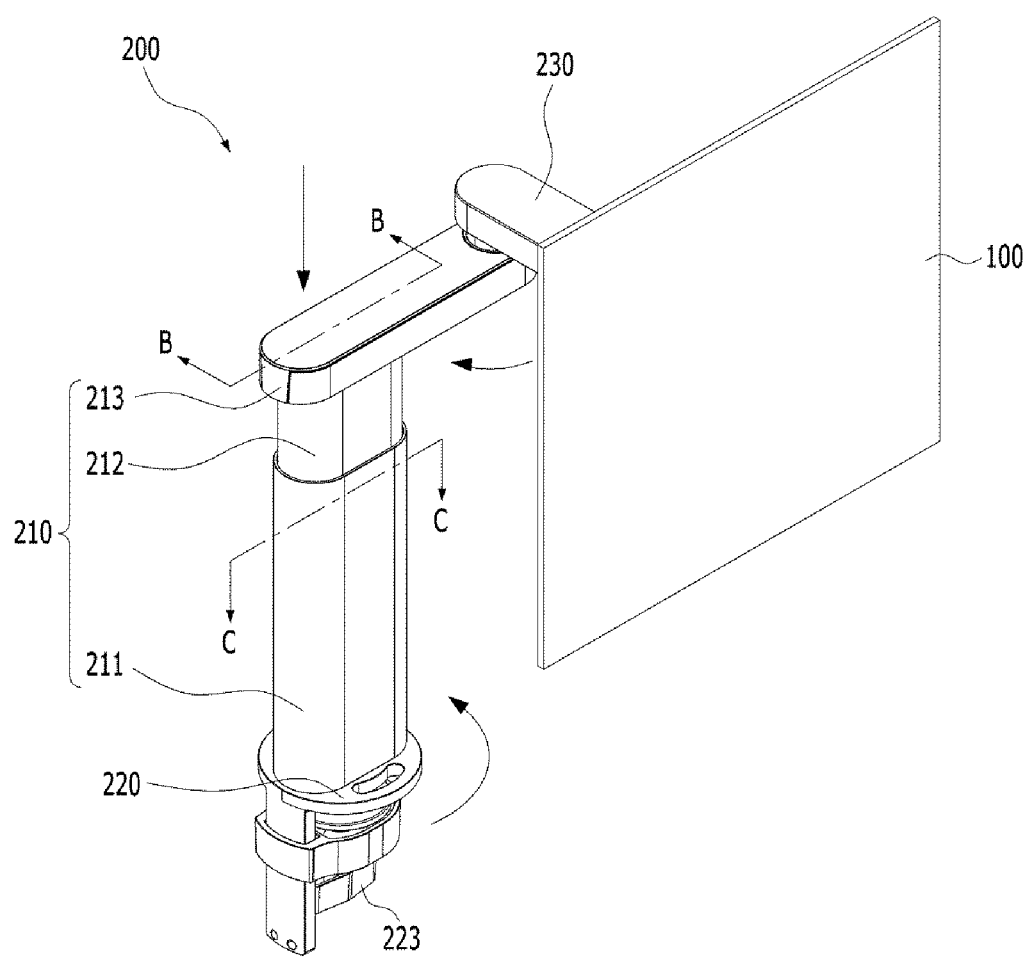

FIGS. 2 and 3 are perspective views illustrating an example of the display device 100 of the present disclosure.

The display device 100 of the present disclosure may include a main body 100' including the display module and a back cover that covers a rear surface of the display module 151, and a stand 200 for placing the main body 100' at a location desired by the user. Hereinafter, the description will be made mainly based on the stand 200 on which the display device 100 is mounted, but the electronic device stand 200 of the present disclosure may be used for supporting various electronic devices other than the main body 100' of the display device 100.

The electronic device stand 200 of the present disclosure may include a base 220) fixed onto a mounting surface, a vertical portion 210 extending in a vertical direction from the base 220, a horizontal portion 230 extending in a horizontal direction from the vertical portion 210, and a coupling portion 240 coupled to the electronic device at an end of the horizontal portion 230.

The base 220 may have a structure that is fixed onto a table, and may have a form of a base plate 221 having a large support area or may include a clamp 223 into which the table is fitted for a fixing force when having the base plate 221 of a small size as shown in FIG. 2.

The base 220 and the vertical portion 210 may be rotatably coupled to each other via a first rotating portion ①, and the horizontal portion 230 and the vertical portion 210 may also be rotatably coupled to each other via a second rotating portion ②. In addition, a third rotating portion ③; positioned between the horizontal portion 230 and the coupling portion 240 may also change a direction of the display main body 100' as the coupling portion 240 rotates with respect to the horizontal portion 230.

The first rotating portion ① to the third rotating portion 3; may rotate about vertical axes of rotation, and a location in the horizontal direction and a location in a front and rear direction of the display main body 100' and a direction in which the display main body 100' is directed may be adjusted by combining rotations of the four members 210, 220, 230, and 240 at the three rotating portions as shown in FIG. 3.

The coupling portion 240 may further include a fourth rotating portion ④ having a horizontal direction as an axis such that the display main body 100' may rotate in the vertical direction.

A vertical level of the display main body 100' may vary when several users use the display device 100 because sitting heights of the users are different from each other. In addition, recently, a vertical level of a desk may be adjusted, so that, when the user uses the display device 100 alternately in a sitting state and a standing state, it may be necessary to adjust a vertical level of the display device 100.

Accordingly, as the vertical portion 210 varies in a length, a vertical level of the electronic device including the display main body 100' located at the coupling portion 240 may be controlled. The vertical portion 210 has a multi-stage shape in which a second casing 212 is inserted into a first casing 211, and varies in the length of the vertical portion 210 depending on a degree to which the second casing 212 is inserted into the first casing 211.

In FIG. 3, the second casing 212 is further inserted into the first casing 211 compared to as shown in FIG. 3, so that, while a vertical level of a movable frame 214 is lowered, vertical levels of the horizontal portion 230, the coupling portion 240, and the display main body 100' may also be lowered.

Figure 4:
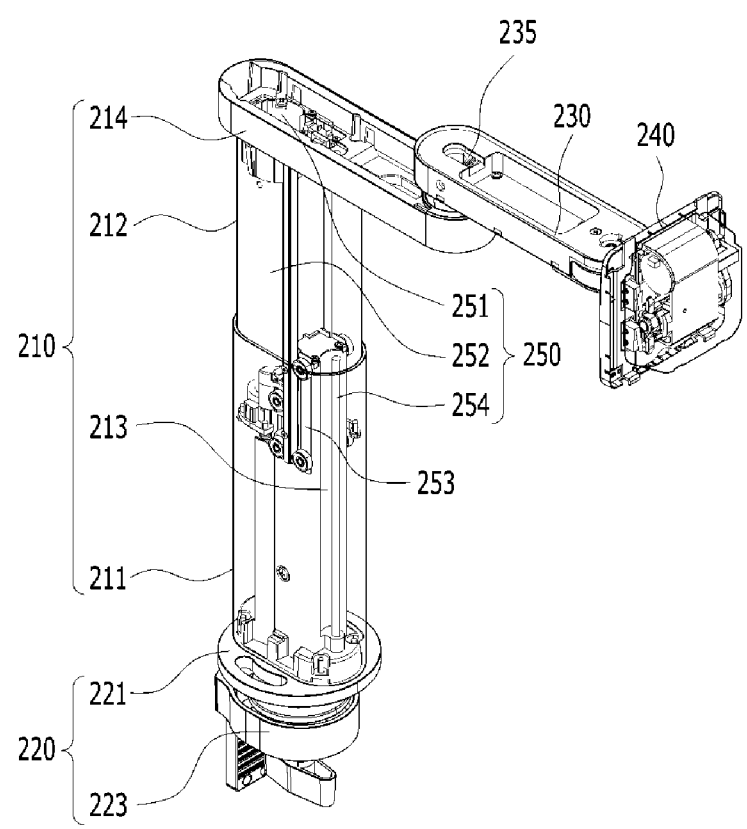
FIG. 4 is a view illustrating an internal structure of an electronic device stand of the present disclosure.

FIG. 4 is a view showing an internal structure of the electronic device stand 200 of the present disclosure. The vertical portion 210 may include a fixed frame 213 located above the base 220, and the movable frame 214 spaced upwardly apart from the fixed frame 213 and to which the horizontal portion 230 is coupled, and include a driver 250 for adjusting a gap between the movable frame 214 and the fixed frame 213.

The first casing 211 may cover the fixed frame 213 and the second casing 212 may cover the driver 250 positioned between the movable frame 214 and the fixed frame 213. Because the second casing 212 moves in the vertical direction, the first casing 211 may have a height capable of covering a lower end of the second casing 212.

The movable frame 214 may have a size corresponding to a size of a cross-section of the second casing 212, or may have a shape extending toward a portion where the horizontal portion 230 is coupled as shown in FIG. 4.

As the movable frame 214 is formed in a shape slightly extending from a vertical extended portion of the vertical portion 210 as shown in FIG. 4, a space of the movable frame 214 in which the driver 250 and the sensor may be mounted and a second hinge portion fastened with the horizontal portion 230 may be arranged in the horizontal direction, which may facilitate assembly.

The fixed frame 213 may be formed as an injection-molded product or formed in a shape of a rigid bar extending in the vertical direction, and may not be exposed to the outside because it is covered with the first casing 211.

Figure 5:
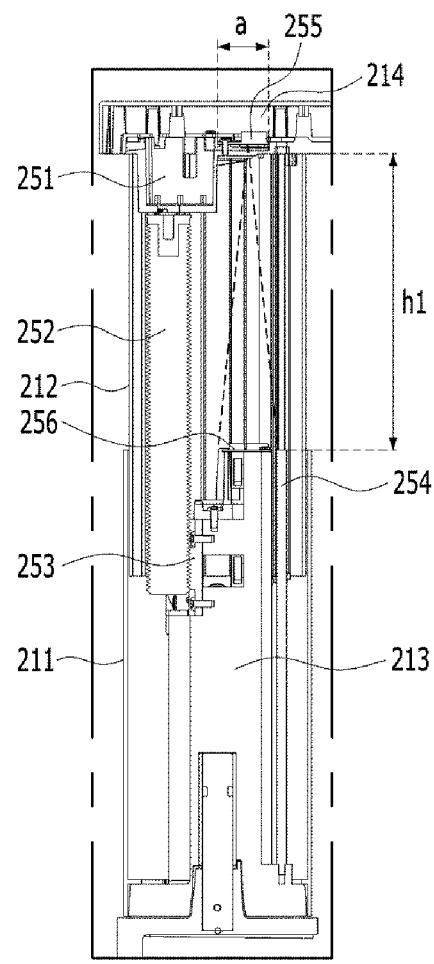
FIG. 5 is a cross-sectional view taken along a line A-A in FIG. 2.
Figure 6:
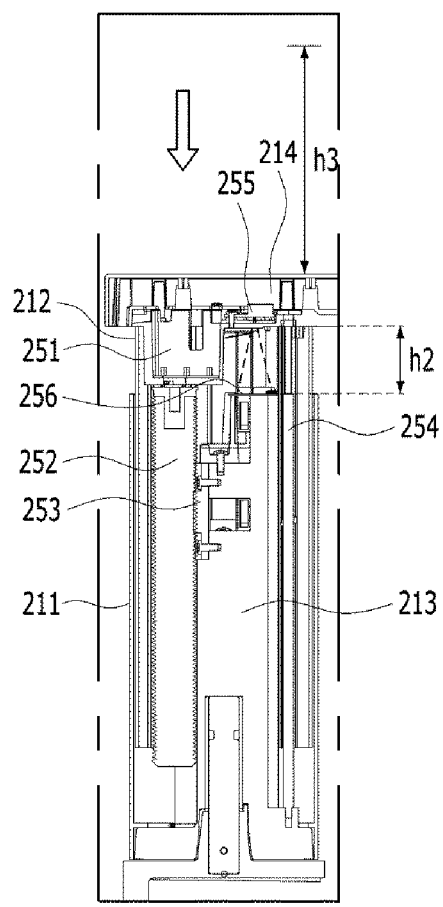
FIG. 6 is a cross-sectional view taken along a line B-B in FIG. 3.

FIG. 5 is a cross-sectional view taken along a line A-A in FIG. 2, and FIG. 6 is a cross-sectional view taken along a line B-B in FIG. 3. FIG. 5 shows a state in which the vertical portion 210 is extended, FIG. 6 shows a state in which the vertical portion 210 is contracted, and FIGS. 5 and 6 show structures of the driver 250 and a distance detecting sensor 255 in detail.

The driver 250 is a linear motor 251 that moves in the vertical direction. The present disclosure may use a lead screw 252 that converts a rotational force of the motor 251 into a linear motion. The lead screw 252 is a bar-shaped member having a screw thread formed on an outer surface thereof, and is rotated by receiving the rotational force of the motor 251.

A moving block 253 includes a hole defined therein in which a helical groove corresponding to the screw thread of the lead screw 252 is defined, and the lead screw 252 passes through the hole of the moving block 253. Because a rotation of the moving block 253 is limited, the moving block 253 moves in the vertical direction without rotating when the lead screw 252 rotates. The rotational force of the motor 251 may be converted into a linear driving force via the lead screw 252 and the moving block 253.

When the motor 251 and the lead screw 252 are fastened to one of the fixed frame 213 and the movable frame 214, and the moving block 253 is fastened to the other, a gap between the movable frame 214 and the fixed frame 213 may be adjusted.

In the present disclosure, electronic parts such as the sensor to be described later may be disposed at an upper portion of the vertical portion 210 to facilitate electrical connection with the display main body 100'. Therefore, it is also advantageous in terms of wiring to dispose the motor in the movable frame 214 located at an upper side as shown in FIG. 5.

The moving block 253 may be fastened to the fixed frame 213, and when the length of the vertical portion 210 is shortened, the lead screw 252 may be inserted into the fixed frame 213 as shown in FIG. 6. The fixed frame 213 has a space for the lead screw 252 to be placed.

The second casing 212 may be introduced into the first casing 211 and a total length of the vertical portion 210 may be shortened by h3.

In order to limit the rotation of the moving block 253, the driver 250 requires an additional component for fastening the fixed frame 213 with the movable frame 214. A guide bar 245 extending parallel to the lead screw 252 may be used to limit a movement in the horizontal direction of the moving block 253 without limiting the movement in the vertical direction of the moving block 253.

The guide bar 245 may be coupled to one of the movable frame 214 and the fixed frame 213, and the other may have a shape including a hole defined therein into which the guide bar may be inserted. As the guide bar is disposed to be spaced apart from the lead screw: 252, the guide bar may support a force applied in a lateral direction when the lead screw 252 rotates.

Furthermore, as the guide bar, a damper cylinder 254 to limit a sudden change in the length of the vertical portion 210 may be used. That is, the guide bar may have a structure of the damper cylinder 254 that buffers a force applied in the vertical direction by becoming a piston inserted into a cylinder rather than the simple bar-shaped guide bar.

Referring to FIG. 5, the damper cylinder 254 in which the guide bar (the piston) is positioned at the fixed frame 213, and the cylinder into which the guide bar is inserted is formed at an upper portion thereof is shown.

The damper cylinder 254 may guide the movable frame 214 to be driven only in the vertical direction by offsetting the rotational force by the lead screw 252 while buffering the change in the length of the vertical portion 210.

An encoder for sensing a rotational speed and a direction of the motor 251 may be equipped, but, because values obtained from the encoder are relative values, a position of the movable frame 214 at which the motor 251 starts driving is unknown.

A separate sensor that may sense a height of the vertical portion 210 is required to precisely place the display main body 100' at a vertical level desired by the user. Because the position of the movable frame 214 varies, a sensor that may measure a distance in a non-contact manner is required, and a small sensor is required considering a size of the electronic device stand 200.

A laser sensor is a device for measuring a distance using a laser. The laser, as light with high straightness, may accurately measure the distance, and may have a wide measurable range. In addition, because the laser is free from interference with other light, there is little change in performance of the laser by an external light source. However, a cost of the laser is high, so that a price of the laser sensor is also high.

The ultrasonic sensor is inexpensive and is less affected by the external light source because of not using light. However, the ultrasonic sensor is greatly affected by surrounding objects and has a great wavelength, so that the ultrasonic sensor is difficult to be used in a narrow space.

A linear scale that measures a distance in a physical manner like the encoder may precisely measure the distance, but have problems of a high price and a large volume.

Accordingly, a time of flight (ToF) sensor having a small size while being inexpensive may be used. The time of flight (ToF) sensor measures a time of flight, and measures a distance from a time it takes for an infrared ray to be reflected and return. The laser sensor also employs the same principle of measuring a time it takes for the emitted light to return, but the time of flight (ToF) sensor uses the inexpensive infrared ray and has a light source small enough to be mounted directly on a substrate.

However, the infrared ray has a large angle of view due to straightness lower than that of the laser. Therefore, as the distance increases, it is difficult to accurately measure the distance due to the angle of view, and the infrared ray is affected by external light, making it difficult to use the time of flight (ToF) sensor in a bright space.

In spite of such disadvantages, the time of flight (ToF) sensor is optimized in terms of wiring and space because the time of flight (ToF) sensor is inexpensive and has a small size so as to be integrally implemented with the substrate for other sensors, the motor 251, and the like in the movable frame 214 without occupying a lot of mounting space.

In addition, in order to compensate for the shortcomings of the ToF sensor described above, the distance may be measured in an inner space of the second casing 212, sensitivity may be increased using a reflector 256, and a measurable distance may be extended using the ToF sensor having a small angle of view.

The ToF sensor applied to the present embodiment should be able to sense a distance equal to or greater than h1 and sense a distance equal to or smaller than h2. Hereinafter, in order to optimize a performance of the distance detecting sensor 255 using the ToF of the electronic device stand 200 of the present disclosure, an arrangement and surrounding components of the distance detecting sensor 255 will be described in more detail.

Figure 7:
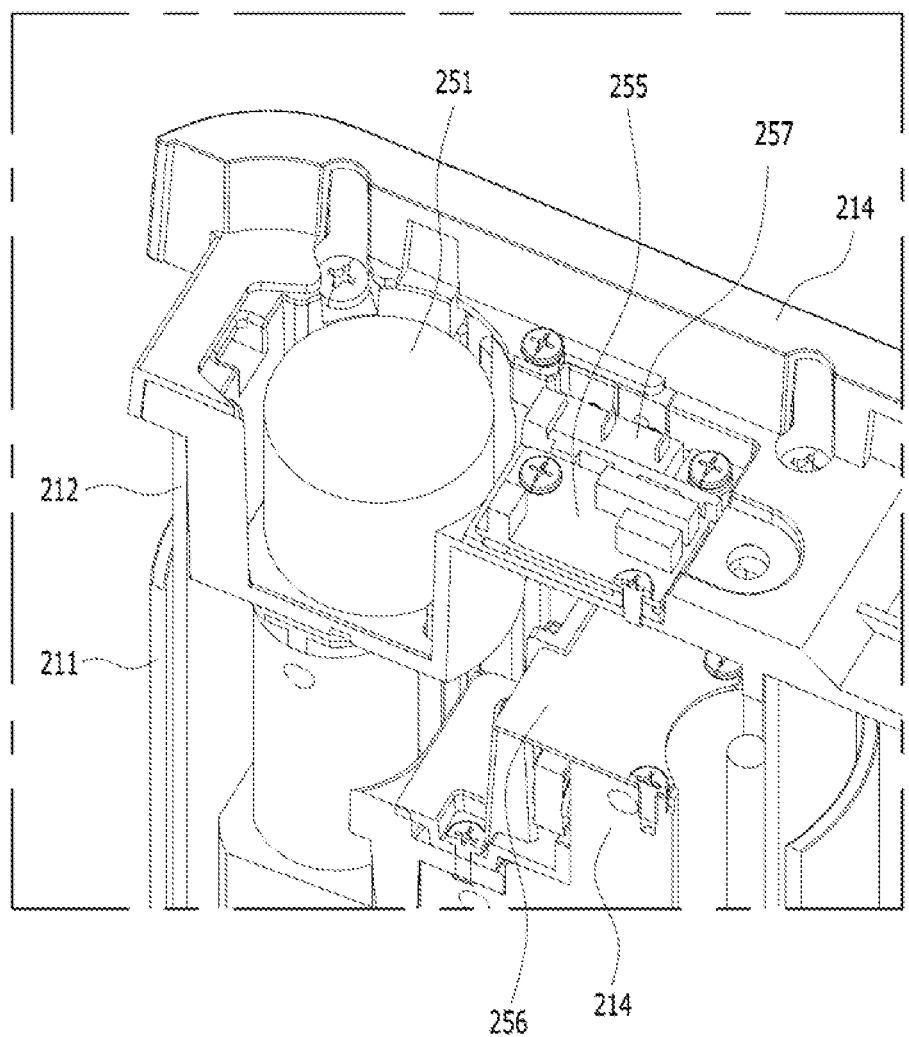
FIG. 7 is a view showing electronic parts of an electronic device stand of the present disclosure.

FIG. 7 is a view showing electronic parts of the electronic device stand 200 of the present disclosure. In FIG. 7, the vertical portion 210 is in the contracted state, and a limit switch 257 and the distance detecting sensor 255 mounted in the movable frame 214 are shown. The limit switch 257 that may be disposed adjacent to the motor 251 of the driver 250, and may limit a driving range of the driver 250 may be further included.

The limit switch 257 generates a stop signal when being physically in contact with an upper end of the fixed frame 213 to stop the operation of the motor 251 of the driver 250. The limit switch 257 may determine the driving range of the driver 250, and may be located adjacent to the distance detecting sensor 255 in the present embodiment.

As shown in FIG. 5, the distance detecting sensor 255 of the present disclosure may be positioned in the movable frame 214 to face downwards and may measure a distance to the fixed frame 213 located below the distance detecting sensor 255. That is, the distance detecting sensor 255 may measure the distance inside the vertical portion 210, and a space through which the light of the distance detecting sensor 255 passes may be located in the inner space surrounded by the second casing 212.

In particular, when the inner space of the second casing 212 is painted in a dark color to block introduction of the external light, accuracy of the sensing of the distance detecting sensor 255 may be increased.

Although the distance detecting sensor 255 may be located outside the vertical portion 210 to sense a distance to the desk rather than being located inside the vertical portion 210, the distance detecting sensor 255 will not be able to accurately measure the distance when being affected by the external light source or when another object is located on the desk that is sensed by the distance detecting sensor 255. In addition, because the distance to be sensed by the distance detecting sensor 255 is a total length of the vertical portion 210 from an upper end of the vertical portion 210, a sensor capable of measuring a relatively long distance is required.

As described above, the ToF is influenced by the external light source, so that it is advantageous to measure the distance inside the vertical portion 210 rather than the outside. In addition, because the distance from the movable frame 214 to the fixed frame 213 is only about a half the distance from the movable frame 214 to the desk, even the TOF sensor is used, the distance may be measured within a relatively small error range.

However, an inner space of the vertical portion 210 is narrow as the driver 250) described above is located, and the upper end of the fixed frame 213 does not have an even surface as shown in FIG. 5, so that it is difficult to accurately measure a distance from the distance detecting sensor 255 to the upper end of the fixed frame.

In order to provide the even surface at the upper end of the fixed frame 213, the reflector 256 may be disposed. The distance may be measured by sensing the light emitted from the distance detecting sensor 255 and returning by being reflected by the reflector 256.

Figure 8:
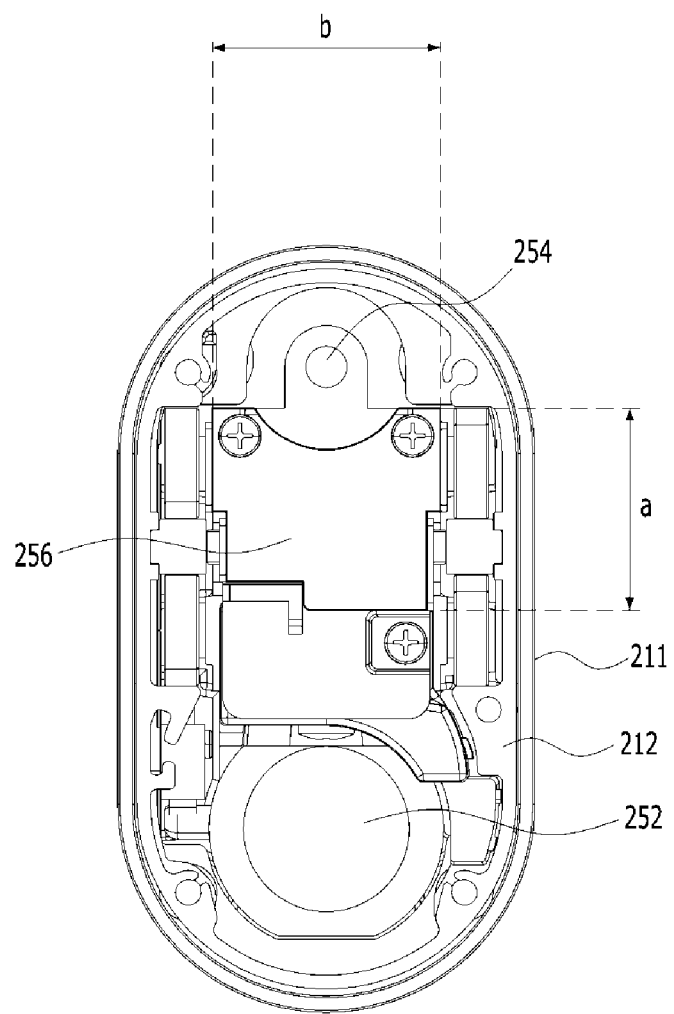
FIG. 8 is a cross-sectional view taken along a line C-C in FIG. 3.

FIG. 8 is a cross-sectional view taken along a line C-C in FIG. 3. The reflector 256 should be sized to fill an empty space a×b inside the second casing 212 as much as possible to increase accuracy of the measurement. When the reflector 256 is too small, the infrared ray may reach a location other than the reflector 256, so that reflectivity may drop at a long range.

The reflector 256 may be positioned between the lead screw 252 and the damper cylinder 254 of the driver 250 as shown in FIG. 7 and may have a maximum size within a range that does not interfere with other components. In the drawing, the motor 251 may be located at a lower side, and the reflector 256 may be disposed to be spaced apart from the lead screw 252 so as not to be in contact with the lead screw 252 when the lead screw: 252 is rotated, and may be disposed to be almost in close contact with the damper cylinder 254 located above the reflector 256.

In the present embodiment, when using the reflector 256 having a size equal to or greater than 25 mm×25 mm, the distance detecting sensor 255 may measure the accurate distance within an error range up to a distance of 200 mm.

The reflector 256 may include a groove having a shape corresponding to a shape of the damper cylinder 254, and the reflector 256 may be fixed to the upper end of fixed frame 213 using protruding portions on both sides of the groove. One end of the reflector 256 may be in contact with the limit switch 257 described above to generate the stop signal, and bearings may be disposed on left and right sides of the reflector 256 for smooth movement.

Figure 9:
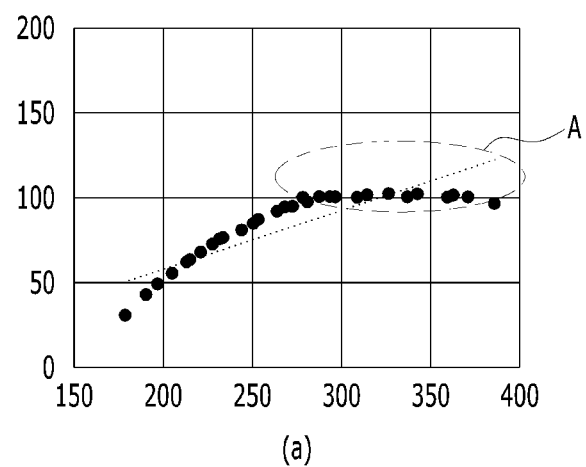
FIG. 9 shows graphs showing performances based on types of reflector.
Figure 9:
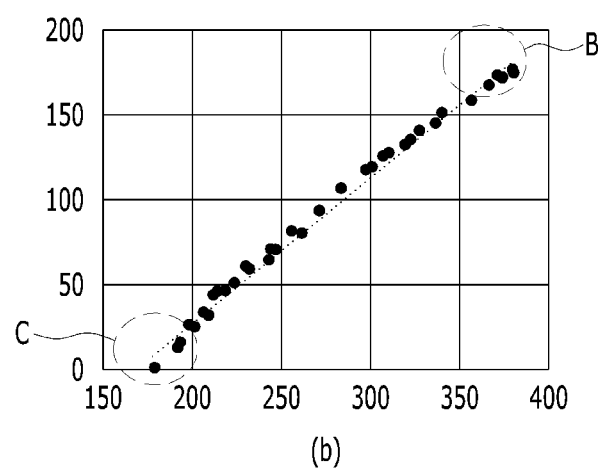

FIG. 9 shows graphs showing performances based on types of reflector 256. (a) is a graph showing a result of using an injection-molded product of a bright color (ivory) as the reflector 256, and (b) is a graph showing a result of using the reflector 256 of a metallic material. A horizontal direction refers to a distance, and a vertical direction refers to a strength of a signal sensed by the ToF sensor.

When matching of the vertical direction and the horizontal direction forms a linear graph, especially forms a slope of 1, the accurate distance measurement is possible. However, when the matching does not form the linear graph or a section in which a slope changes occurs, it is difficult to accurately measure the distance due to an error.

A test was performed to implement the distance detecting sensor 255 that may measure the distance while having linearity from 30 mm to 200 mm in order to experimentally sense a position of the movable frame moving in a section of 170 mm. However, in consideration of an error range, the test was designed such that a performance over a certain level is achieved even at a distance equal to or shorter than 30 mm or equal to or longer than 200 mm.

The ToF sensor generally has the angle of view of about 25°, so that an error of about 4-5 mm may occur at a distance of about 200 mm. When a ToF sensor with a smaller angle of view, for example, an angle of view of about 18° is used, the error may be lowered to a level of 2.5 mm.

The error level of about 2.5 mm does not significantly affect the control of the height of the vertical portion 210 because an error of a level equal to or lower than about 7-8 mm is not sensed in the height control for matching an eye level of the user.

The ToF sensor that has a large angle of view at a close range and a smaller angle of view at a long range may be used. In the present embodiment, the TOF sensor may have an angle of view of about 22° at the close range, but may reduce the angle of view to a level of 18° when the distance increases, thereby reducing the error.

Because the distance detecting sensor 255 of the present disclosure uses the infrared ray, when the distance is too short, it is difficult to accurately measure the distance because a speed of the reflected and returning light is too fast. In addition, because a distance to the adjacent lead screw 252, the damper cylinder 254, or the second casing 212 and a distance to the reflector 256 are similar to each other, it is difficult to accurately measure the distance. Therefore, a distance between the reflector 256 and the distance detecting sensor 255 may be designed to be at least about 30 mm.

The reflector 256 may have a planar shape that minimizes irregularities on a surface thereof in order to reflect the infrared ray. When the fixed frame 213 is molded with the injection-molded product, the reflector 256 may be manufactured with the same injection-molded product as the fixed frame 213. A surface material and a color of the injection-molded product may be freely adjusted, but the injection-molded product may have a reflectivity lower than that of a metal.

Referring to (a) in FIG. 9, the graph shows the result of the distance detecting sensor 255 when the reflector 256 is implemented with the injection-molded product of the bright color. When reaching a certain distance, the distance detecting sensor 255 may no longer be able to measure the distance (a section A).

In addition, because the slope is gentle, it is necessary to tune the distance detecting sensor 255 for the linear matching, but there is a problem in that the error becomes greater. An intensity of the light reaching the distance detecting sensor 255 is increased such that the slope of the graph between the actual distance to the reflector 256 and the distance sensed by the distance detecting sensor 255 becomes 1.

(b) in FIG. 9 is a graph showing the result of the distance detecting sensor 255 when the reflector 256 implemented using a metal SUS steel plate is used to increase the reflectivity. A slope of the graph may be steeper than that of the injection-molded reflector 256 in (a).

Because the distance between the distance detecting sensor 255 and the reflector 256 may be measured as the linearity is almost maintained even in a section B around 200 mm, the distance may be measured with uniform accuracy even at the long range.

However, because the reflectivity of the reflector 256 is high, the reflectivity is too high in a short-range section C within 30 mm, so that accuracy of an initial value may be low. Therefore, the reflector 256 may be made of the metallic material and may be coated with the bright color such as white to lower the reflectivity. By manufacturing the reflector 256 so as to have the reflectivity of a value between that of the injection-molded product and that of the metallic material, the distance detecting sensor 255 may be controlled to measure the accurate value even at the close range.

Figure 10:
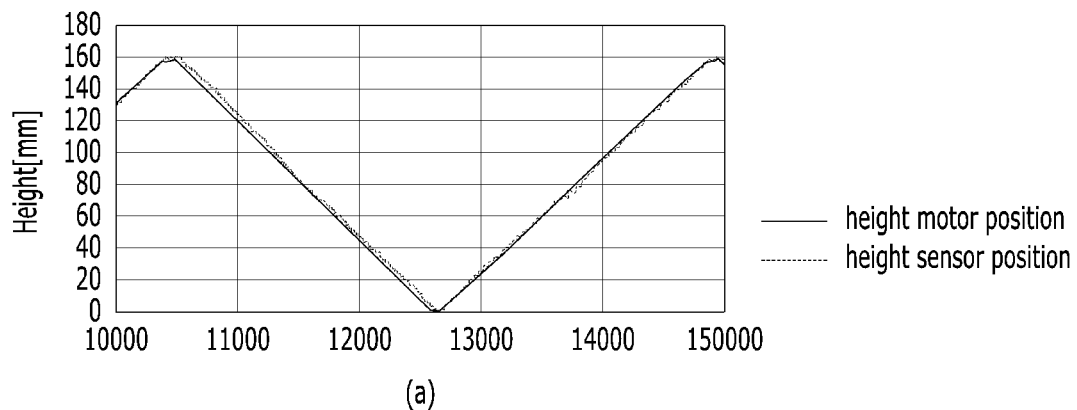
FIG. 10 shows graphs showing a signal of the distance detecting sensor, a moving distance of the driver, and an error.
Figure 10:
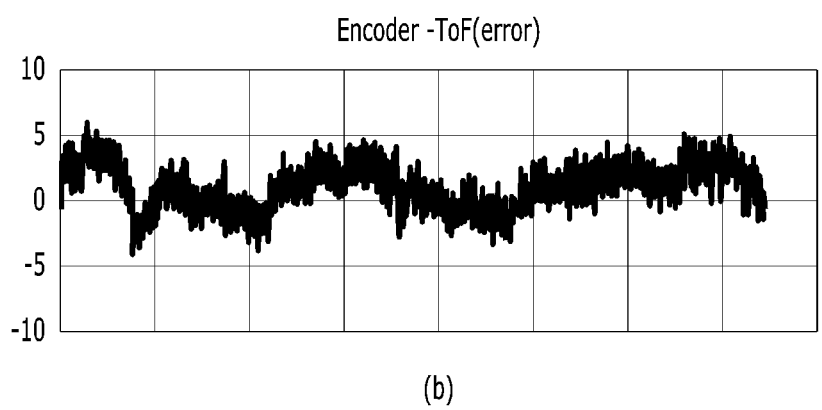

FIG. 10 shows graphs showing a signal of the distance detecting sensor 255, a moving distance of the driver 250, and an error. As shown in (a), the distance detecting sensor 255 is synchronized to the actual vertical movement of the driver 250 and a linear result is obtained. In addition, (b) shows the error between the two values. When the error has a value within +5 on average, the value may be determined to be accurate. Therefore, the height of the vertical portion 210 may be automatically controlled using the distance detecting sensor 255 of the present disclosure.

The electronic device stand 200 of the present disclosure may sense the height of the vertical portion 210, thereby automatically controlling the vertical portion 210 to have the correct height.

The electronic device stand 200 may sense an absolute location thereof without an increase in the size thereof because of the small volume of the distance detecting sensor.

In addition, an increase in cost may be minimized because the measurement may be performed at a low cost.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. An electronic device stand comprising:
a base positioned on a mounting surface;
a vertical portion extending in an upward direction from the base and having a variable length;
a horizontal portion rotatably connected to an upper end of the vertical portion; and
an electronic device coupling portion connected to an end of the horizontal portion,
wherein the vertical portion includes:
a fixed frame connected to the base;
a movable frame connected to the horizontal portion;
a driver for controlling a distance between the movable frame and the fixed frame;
a distance detecting sensor for sensing the distance between the movable frame and the fixed frame; and
a reflector positioned at an upper end of the fixed frame and facing the distance detecting sensor,
wherein the distance detecting sensor includes a time of flight (ToF) sensor including a light emitter for outputting an infrared signal and a light receiver for sensing the reflected and returning infrared signal, and
wherein an angle of view of the ToF sensor is larger at a close range and smaller at a long range.

2. The electronic device stand of claim 1, wherein the TOF sensor has an angle of view equal to or smaller than 22°.

3. The electronic device stand of claim 1, wherein the TOF sensor is configured to measure a linear distance equal to or longer than 200 mm.

4. The electronic device stand of claim 1, wherein the reflector contains a metal material.

5. The electronic device stand of claim 4, wherein the reflector includes a white coated surface.

6. The electronic device stand of claim 4, wherein one side of the reflector has a length equal to or greater than 25 mm.

7. The electronic device stand of claim 1, further comprising a limit switch positioned side by side with the distance detecting sensor in the movable frame and configured to generate a limit signal to stop the driver when being in contact with the reflector.

8. The electronic device stand of claim 1, further comprising a second casing configured to cover a section between the movable frame and the fixed frame, wherein an inner surface of the second casing has a dark color.

9. The electronic device stand of claim 1, wherein the driver includes:
a motor fixed to the movable frame;
a lead screw extending from the motor; and
a moving block having a hole defined therein for the lead screw to be inserted, wherein the moving block is fastened with the fixed frame,
wherein, when the lead screw is rotated by the motor, the moving block moves along the lead screw and the distance between the movable frame and the fixed frame changes.

10. The electronic device stand of claim 9, wherein the driver further includes a damper cylinder,
wherein the reflector is positioned between the lead screw and the damper cylinder,
wherein the reflector includes a groove defined at one side thereof having a shape corresponding to a shape of the damper cylinder.

11. The electronic device stand of claim 10, wherein screws fastened with the fixed frame are included in protruding portions on both sides of the groove of the reflector.

12. The electronic device stand of claim 1, wherein one side of the movable frame fastened with the horizontal portion extends in a horizontal direction.

13. The electronic device stand of claim 1, wherein the base further includes a clamp to be fixed to a table.

14. A display device comprising:
a display module for outputting an image;
a back cover located on a rear surface of the display module; and
a stand coupled to the back cover so as to support the display module,
wherein the stand includes:
a base positioned on a mounting surface;
a vertical portion extending in an upward direction from the base and having a variable length;
a horizontal portion rotatably connected to an upper end of the vertical portion; and
a coupling portion connected to an end of the horizontal portion and coupled to the back cover,
wherein the vertical portion includes:
a fixed frame connected to the base;
a movable frame connected to the horizontal portion;
a driver for controlling a distance between the movable frame and the fixed frame;
a distance detecting sensor for sensing the distance between the movable frame and the fixed frame; and
a reflector positioned at an upper end of the fixed frame and facing the distance detecting sensor,
wherein the distance detecting sensor includes a time of flight (ToF) sensor including a light emitter for outputting an infrared signal and a light receiver for sensing the reflected and returning infrared signal, and
wherein an angle of view of the ToF sensor is larger at a close range and smaller at a long range.

15. An electronic device stand comprising:
a base positioned on a mounting surface;
a vertical portion extending in an upward direction from the base and varying in a length;
a horizontal portion rotatably connected to an upper end of the vertical portion; and
an electronic device coupling portion connected to an end of the horizontal portion,
wherein the vertical portion includes:

a fixed frame connected to the base;
a movable frame connected to the horizontal portion;
a driver for controlling a distance between the movable frame and the fixed frame;
a distance detecting sensor for sensing the distance between the movable frame and the fixed frame; and
a reflector positioned at an upper end of the fixed frame and facing the distance detecting sensor,
wherein the driver includes:
a motor fixed to the movable frame;
a lead screw extending from the motor;
a moving block having a hole defined therein for the lead screw to be inserted, wherein the moving block is fastened with the fixed frame, and
a damper cylinder,
wherein when the lead screw is rotated by the motor, the moving block moves along the lead screw and the distance between the movable frame and the fixed frame changes; and
wherein the reflector is positioned between the lead screw and the damper cylinder.

16. The electronic device stand of claim 15, wherein the reflector includes a groove defined at one side thereof having a shape corresponding to a shape of the damper cylinder.

17. The electronic device stand of claim 15, wherein screws fastened with the fixed frame are included in protruding portions on both sides of a groove of the reflector.

* * * * *